United States Patent Office 2,821,460
Patented Jan. 28, 1958

---

2,821,460

METHOD OF PURIFYING SILICON TETRACHLORIDE AND GERMANIUM TETRACHLORIDE

James M. Whelan, Newark, N. J., assignor to Bell Telephone Laboratories, Incorporated, New York, N. Y., a corporation of New York No Drawing. Application August 31, 1955
Serial No. 531,822

10 Claims. (Cl. 23—87)

This invention relates to a method for removing phosphorus-bearing impurities from volatile compounds.

The method may be described with particularity by reference to the removal of phosphorus chloride impurities from silicon tetrachloride.

The silicon tetrachloride of commerce is commonly produced by the reaction of chlorine with silicon. The latter material, in turn, is most usually obtained by a high-temperature arc reduction of silicon dioxide with coke. The silicon so produced may contain 1 percent to 2 percent of impurities, largely iron, aluminum, boron, and phosphorus. These impurities, at least in part, are converted to their respective chlorides when the silicon is itself reacted with chlorine to form silicon tetrachloride.

A considerable quantity of the chloride impurities so introduced into silicon tetrachloride may be subsequently removed by distillation of the volatile silicon compound. At normal pressures, the boiling point of silicon tetrachloride, a colorless fuming liquid, is 57.6° C.

For the removal of phosphorus pentachloride, which sublimes at a temperature of about 162° C., the discard of the later-boiling fractions of distilled silicon tetrachloride would be expected to give a product, largely from a middle fraction of the distillate, essentially free of phosphorus pentachloride. Considerable amounts of phosphorus containing impurities remain in the distillate however. It is believed that the impurity is largely phosphorus trichloride. The trichloride may be present as an impurity from the chlorine oxidation of silicon, during manufacture, or may also be produced by a decomposition of phosphorus pentachloride at distillation temperatures according to the reaction

$$PCl_5 \rightarrow PCl_3 + Cl_2$$

The removal of this phosphorus trichloride, boiling at 75.5° C., is especially difficult because of the close-lying silicon tetrachloride boiling point. By ordinary chemical standards, an adequate separation could probably be obtained with careful fractional distillation, though. But if the silicon tertachloride is later reduced to elemental metallic silicon, sufficient phosphorus chloride impurities may remain in the distillate and be reduced with the silicon tetrachloride to enterfere seriously with desirable electrical properties of the silicon.

Such is particularly true if the silicon obtained in this manner is later used in the production of semiconductor devices. In the manufacture of such devices, notoriously only the most contaminant-free starting materials are usually desired, as extremely small impurity concentrations shown large effects on semiconductor conductivity properties.

The present invention concerns a method for complexing phosphorus pentachloride impurities in silicon tetrachloride with aluminum trichloride to form a stable compound with a high boiling point. Separation of the silicon tetrachloride, now relatively much more volatile than the stably-complexed impurities, by distillation for example, yields silicon tetrachloride fractions with very low concentrations of phosphorus-bearing contaminants. Reduction of this silicon compound gives metallic silicon which contains less interfering phosphorus than does silicon heretofore prepared from untreated silicon tetrachloride.

Some of the properties of the highly stable complex formed between aluminum trichloride and phosphorus pentachloride are mentioned in the article by W. Fischer and O. Jübermann, published in Zeitschrift für anorganische und allgemeine Chemie, volume 235, pages 337 through 351, in 1938. The compound is reported to have the formula $AlPCl_8$, corresponding to a one-to-one association of aluminum trichloride and phosphorus pentachloride. The high melting point, 380° C., of the complex, and its low vapor pressure even at elevated temperatures, explain the clean separation obtainable from silicon tetrachloride at the silicon tetrachloride boiling point near 57° C.

The complexing agent used to complex phosphorus pentachloride contaminants in silicon tetrachloride is, as mentioned, aluminum trichloride, $AlCl_3$ or $Al_2Cl_6$. This compound, the room temperature solubility of which in silicon tetrachloride is about $4(10^{-3})$ mole percent, sublimes at about 178° C. at normal pressures. This temperature is well above the normal boiling point of silicon tetrachloride. Thus, small amounts of excess, non-complexed aluminum trichloride do not tend to contaminate distillates fractionated from silicon tetrachloride in which the aluminum compound is used as a complexing agent.

In the preferred practice of the purification process which is the subject of this invention, phosphorus-containing impurities present in silicon tetrachloride are oxidized with chlorine to phosphorus pentachloride. A small amount of aluminum trichloride is then allowed to contact the silicon tetrachloride to be purified. This is most easily done by adding solid aluminum trichloride to the liquid and permitting the mixture to stand. After opportunity for formation of the complex, which in the literature is reputed to have the formula $AlPCl_8$, the volatile liquid silicon tetrachloride is separated, as by distillation, from the mixture, with or without decantation from any residual visible solid. What is important is the formation of the complex with phosphorus pentachloride. To this end, phosphorus impurities in lower valence states should be converted to the pentachloride, an excess of the complexing reagent is desirable, and a reasonable time should be allowed for the reaction of the complexing agent with the impurities to be complexed.

The concentration of phosphorus-bearing impurities, and the chemical identity of such impurities, found in silicon tetrachloride, is variable with the treatment given the tetrachloride by its manufacturer before sale. Though the content of elemental phosphorus in the metallic silicon which is oxidized in forming the tetrachloride may be fairly high, a preferential oxidation of silicon by chlorine may occur with a subsequent decrease in the concentration of phosphorus, as phosphorus chlorides, in the product. A preliminary distillation by way of purification may be done on the product before sale. If the silicon tetrachloride is not distilled, it may contain moderate concentrations of dissolved chlorine, acting to keep any phosphorus-containing impurity present in the mixture in the pentavalent state.

With the important reservation that unusual treatment during manufacture will affect the typical concentrations mentioned, commercial C. P. grade silicon tetrachloride may be characterized as usually containing between about $10^{-6}$ mole percent and $10^{-4}$ mole percent of phosphorus chlorides. The amount of total phosphorus chloride present as the trichloride and the amount present as the pentachloride is variable.

As formation of the complex $AlCl_3 \cdot PCl_5$ requires the presence of phosphorus as the pentachloride, in the method herein described steps are taken to ensure conversion of phosphorus compounds present as contaminants to the pentachloride. This is conveniently done by the addition of chlorine to the silicon tetrachloride sample being treated. In order that the concentration of chlorine may be controlled, an aliquot portion of a solution of silicon tetrachloride containing a known concentration of dissolved chlorine is advantageously added to the silicon tetrachloride sample to be purified. For the preparation of the silicon tetrachloride solution of chlorine, a measured quantity of liquid chlorine is commonly distilled into the silicon tetrachloride solvent. The liquid chlorine is condensed from gaseous chlorine by passage of the gas through a trap kept at a low temperature. Such a trap, for instance, may be surrounded by a "Dry Ice" and acetone mixture. The volume of the liquid chlorine is conveniently taken as an approximate measure of its quantity. As the density of liquid chlorine has been reported to be 1.557 grams per cubic centimeter at minus 34° C., approximately the boiling point of liquid chlorine, volume measurements are usually made at a temperature as close to the boiling point as is possible without losing large quantities of the liquid. The moles of chlorine present as the liquid can then be calculated.

The graduated bulb in which the liquid material is condensed, or in which it is measured after condensation, advantageously is fitted with a vent tube which may be submerged in silicon tetrachloride kept at 0° C. As the chlorine warms in its container, the liquid chlorine distills into the silicon tetrachloride. The solubility of chlorine in silicon tetrachloride, 0.131 gram of chlorine per gram of silicon tetrachloride at 0° C., is sufficiently high that essentially all of the gas distilled into the tetrachloride dissolves without loss from bubbling.

To ensure that the equilibrium $$PCl_3 + Cl_2 \rightarrow PCl_5$$

in the solution is displaced far to the right, an excess of chlorine, beyond that amount necessary for exact stoichiometry, is preferably added to the silicon tetrachloride. Theoretically, the greater the amount of chlorine that is added, the more effective is the conversion to phosphorus pentachloride. From a practical viewpoint however, the chlorine may itself be a source of impurities and the least amount consistent with successful oxidation to the pentachloride is preferred.

Usually, the chlorine concentration in the silicon tetrachloride is kept in excess of the estimated total concentration of phosphorus-bearing impurities by a factor of at least 10, and preferably of at least 100. For the average commercial silicon tetrachloride sample, containing between about $10^{-4}$ mole percent and $10^{-6}$ mole percent of phosphorus chloride contaminants, a maximum mole fraction of chlorine of $10^{-3}$ has been found adequate. The amount of chlorine present may be reduced if the phosphorus compounds present as impurities are known to be already largely in the form of the pentachloride. Similarly, if there is considerable dissolved chlorine remaining in the silicon tetrachloride from the manufacturing stage, the amount of additional chlorine required to keep an oxidizing environment in the solution is lessened, and chlorine addition may be dispensed with entirely where chlorine is present in the commercial sample in high concentrations. For those average commercial samples in which the maximum concentration of phosphorus-compound impurity is about $10^{-4}$ mole percent, and for which the relative concentrations of phosphorus trichloride and pentachloride are unknown, the figure of $10^{-3}$ for the total chlorine mole fraction is recommended.

For convenience, as earlier mentioned, liquid chlorine is generally distilled into silicon tetrachloride. An aliquot of this solution, of a known concentration in chlorine, may then be taken and added to a sample of silicon tetrachloride to be distilled. This technique is by no means necessary to successful practise of the invention however. Other methods of adding chlorine to the silicon tetrachloride, including a simple bubbling of the gas through the sample, may be used. If there need be no concern for the purity of the chlorine used, and hence for the amount of possible impurity being added to the sample with the gas, chlorine may be added till the solution is saturated, and no attempt to limit or control the amount added is required.

In the complex formation step, $$2PCl_5 + Al_2Cl_6 \rightarrow 2PCl_5 \cdot AlCl_3$$

also, an excess of aluminum chloride, the complexing reagent, is preferred to assure a high degree of complex formation, or conversely, a low concentration of uncomplexed phosphorus pentachloride. As in the case of chlorine addition, aluminum chloride is also added till the number of moles of aluminum chloride present is at least 10 to 100 times greater than the estimated total number of moles of phosphorus chlorides present in the sample. For the average commercial sample of C. P. grade silicon tetrachloride, containing between $10^{-6}$ mole percent and $10^{-4}$ mole percent of phosphorus chloride impurities, a maximum amount of added aluminum chloride of about $10^{-2}$ mole percent has proved satisfactory. If a larger or smaller impurity content is encountered, the amount of aluminum chloride added may be proportionately increased or reduced. The estimated room temperature solubility of aluminum chloride, as $Al_2Cl_6$, in silicon tetrachloride, is $4(10^{-3})$ mole percent. As it is preferable to saturate the silicon tetrachloride with the aluminum compound, it is best not to decrease the aluminum chloride concentration below this value. It is believed that an involatile solid solution is formed between the $AlCl_3 \cdot PCl_5$ complex and unreacted, undissolved, excess aluminum chloride. As the formation of such a solid solution would be favorable to the separation, a small amount of solid unreacted aluminum chloride is preferred in the silicon tetrachloride. Large excesses of the aluminum compound, however, are preferably avoided as being a possible source of trace contaminants for the silicon tetrachloride, as was the case also for chlorine addition.

After the aluminum chloride has been added to the silicon tetrachloride batch being purified, the crystalline material is preferably ground under the surface of the tetrachloride. The grinding aids both in presenting a large area of the aluminum compound to the liquid, facilitating solution, and in exposing fresh surfaces of the aluminum chloride, free from the effects of any hydrolysis which may have taken place on the outer portions of the crystals exposed to the atmosphere during storage.

Though agitation of the mixture may help the solution of the added aluminum chloride, it is not necessary. Most conveniently, the mixture is merely permitted to stand overnight, about sixteen hours, without further attention.

Within this time interval, solution of the aluminum chloride occurs and equilibrium is reached in the complex formation reaction. Longer periods of time for equilibration are not harmful, as long as any phosphorus pentachlorides present are not reduced to the trivalent compound. If the mixture is agitated to help solution of the aluminum trichloride, the reaction time may be reduced.

The formation of the complex is not significantly affected by the order in which chlorine and aluminum chloride are added to the silicon tetrachloride. In the most usual manner of practising the invention, the chlorine and aluminum chloride are added practically simultaneously, but such is a matter of convenience only.

After the treatment with the complexing agent, separation of the purified silicon tetrachloride from the complexed impurities and from any excess of the complexing reagent is carried out. Distillation has proved an effective mode of separation. In distillation, a first-boiling fraction, about 10 percent of the total liquid charge, is usually discarded. This first fraction commonly contains dissolved chlorine. Leaving a high-boiling fraction, also about 10 percent of the total liquid charge, as a still residue, a middle fraction of purified silicon tetrachloride is collected. Any undissolved aluminum chloride is retained in the still with the liquid still residue.

Another separation method commonly used, especially where the purified silicon tetrachloride is to be reduced to metallic silicon, comprises bubbling a hydrogen stream through the silicon tetrachloride-chlorine-aluminum trichloride solution. The hydrogen stream may be saturated with the volatile silicon tetrachloride, leaving the less volatile complex and unreacted complexing agent behind. The hydrogen stream containing essentially pure silicon tetrachloride vapors mixed therewith may be directly passed over a hot filament, as taught in the article by Rudolf Hölbling in Zeitschrift für angewandte Chemie, volume 40, pages 655 through 659, 1927. Such a procedure will accomplish reduction of the silicon tetrachloride to silicon. A relatively impure and involatile fraction of the mixture, as well as any solid residue, is left behind in the reaction flask, as in a distillation.

In either the fractionation described above, or in a conventional distillation process, pressures above or below atmospheric may be kept over the silicon tetrachloride if desired, without noticeably affecting the efficiency of the separation of the volatile silicon tetrachloride from the involatile aluminum trichloride-phosphorus pentachloride complex.

Use may also be made of the tendency of the complex to form solid solutions with aluminum chloride to remove the complex from silicon tetrachloride. Silicon tetrachloride containing dissolved chlorine therein may simply be passed through a filter bed packed with aluminum chloride. The complex is both formed and removed from solution by reaction with the material composing the filter. When commercial sources of aluminum chloride show a relatively high impurity content, this method is contraindicated, lest more impurities be leached from the filter bed than are removed by it.

The efficacy of the complexing treatment when followed by a distillation is demonstrated by a comparison of two samples of silicon tetrachloride to which phosphorus trichloride had been added to reach a mole fraction of $7(10^{-7})$. Both solutions were treated with chlorine to contain between $2(10^{-1})$ mole percent and $3(10^{-1})$ mole percent of dissolved chlorine. After addition of aluminum chloride to one of the samples, in a total amount of approximately $4.3(10^{-2})$ mole percent, both samples were distilled and then reduced to elemental silicon. Measurement of conductivity showed that the sample for which aluminum chloride had been used to complex phosphorus pentachloride impurities gave n-type silicon of 125 ohm-centimeters resistivity, corresponding to a phosphorus impurity content of only $2(10^{14})$ phosphorus atoms per cubic centimeter. The untreated silicon tetrachloride sample yielded 0.1 ohm-centimeter, n-type silicon containing $7(10^{16})$ phosphorus atoms per cubic centimeter. An approximate hundred-fold decrease in the concentration of phosphorus impurities has thus been brought about by complexing phosphorus pentachloride in the silicon tetrachloride before distillation.

Though the method has been described as being of particular interest for removing phosphorus pentachloride impurities from silicon tetrachloride, it may be used to complex phosphorus pentachloride in other volatile materials. There is particular usefulness in purifying other volatile compounds of silicon and some volatile compounds of germanium. For reasons stated earlier, small amounts of impurities are particularly detrimental in these compounds of semiconducting elements.

The solvents containing phosphorus pentachloride which are best suited to purification by this method are those which boil between about 0° C. and 150° C. Preferably they are those which boil between 0° C. and 100° C. Compounds with higher boiling points become increasingly difficult to separate from the complex once formed. Compounds with boiling points below 0° C. are more easily distilled from phosphorus trichloride and pentachloride without the requirement of intermediate treatment by complexing agents.

The solvent should also be relatively less reactive with aluminum chloride than is the phosphorus pentachloride to be removed. That is, the solvent being purified should not preferentially complex with the added aluminum compound, leaving the phosphorus pentachloride unreacted. In general, compounds which are weaker Lewis bases than is phosphorus pentachloride, particularly silicon tetrachloride and germanium tetrachloride, will be most advantageously purified using the method described.

Other suitable compounds are: trisilane, $Si_3H_8$; tetrasilane, $Si_4H_{10}$; trichlorosilicane, $SiHCl_3$; disilicon hexachloride, $Si_2Cl_6$; trichlorogermane, $GeHCl_3$; dichlorogermane, $GeH_2Cl_2$; digermane, $Ge_2H_6$; and trigermane, $Ge_3H_8$.

The steps of complex formation and the underlying principles of the method are the same when used with these compounds as when practised on silicon tetrachloride. Only minor variations in separation procedures, such as distillation, need be made to accommodate these compounds having slightly different boiling points.

What is claimed is:

1. The method of treating volatile compounds of elements which are members of the class consisting of germanium and silicon, said compounds having phosphorus-containing impurities therein, which method comprises contacting aluminum chloride with such compounds which boil between 0° C. and 100° C. and which are less basic than is phosphorus pentachloride, maintaining such contact until the complex $AlCl_3 \cdot PCl_5$ is formed, and then separating said volatile compounds from the complex.

2. The method of removing phosphorus chloride impurities from the volatile tetrachlorides of elements which are members of the class consisting of germanium and silicon, which method comprises contacting said volatile tetrachlorides with such a number of moles of aluminum chloride as exceeds the molar content of said phosphorus chloride impurities, maintaining such contact until the complex $AlCl_3 \cdot PCl_5$ is formed, and then separating said volatile tetrachlorides from the complex.

3. The method of purifying silicon tetrachloride of phosphorus chloride impurities which comprises contacting said tetrachloride with at least a ten-fold molar excess of aluminum chloride above the molar content of said phosphorus chloride impurities, maintaining such contact until the complex $AlCl_3 \cdot PCl_5$ is formed, and then separating the volatile silicon tetrachloride from the complex.

4. The method of purifying silicon tetrachloride of phosphorus-containing impurities which comprises converting said impurities to phosphorus pentachloride by the action of chlorine thereon, complexing said phosphorus pentachloride with aluminum chloride to form $AlCl_3 \cdot PCl_5$, and separating the silicon tetrachloride from the higher-boiling complex by distillation.

5. The method of purifying silicon tetrachloride which comprises adding thereto sufficient chlorine to convert phosphorus-containing impurities to phosphorus pentachloride and then passing the solution through a filter bed containing aluminum chloride, whereby said phosphorus pentachloride reacts with said aluminum chloride to form the complex $AlCl_3 \cdot PCl_5$ which is retained on said filter bed because of the affinity of the complex for aluminum chloride.

6. The method of purifying silicon tetrachloride which comprises adding thereto sufficient chlorine to convert phosphorus-containing impurities to phosphorus pentachloride and sufficient aluminum chloride to saturate the solution, causing the mixture to react to formation of the complex $AlCl_3 \cdot PCl_5$ by maintaining contact between said aluminum chloride and said silicon tetrachloride, and separating the silicon tetrachloride from the complex by distillation.

7. The method of purifying silicon tetrachloride which comprises adding thereto at least $10^{-1}$ mole percent of chlorine and sufficient aluminum chloride to saturate the solution, causing the mixture to stand at least sixteen hours, whereby phosphorus chloride impurities are complexed with said aluminum chloride to form the complex $AlCl_3 \cdot PCl_5$, and separating the silicon tetrachloride from the complex.

8. The method of purifying silicon tetrachloride which comprises adding thereto at least $10^{-1}$ mole percent of chlorine and at least $10^{-2}$ mole percent of aluminum chloride as $Al_2Cl_6$, triturating the aluminum chloride beneath the surface of the silicon tetrachloride, causing the mixture to stand for at least sixteen hours, whereby phosphorus chloride impurities react with said aluminum chloride to form the complex $AlCl_3 \cdot PCl_5$, and separating the silicon tetrachloride from the complex by distillation.

9. The method of purifying germanium tetrachloride which comprises adding thereto at least $10^{-1}$ mole percent of chlorine and at least $10^{-2}$ mole percent of aluminum chloride as $Al_2Cl_6$, triturating the aluminum chloride beneath the surface of the germanium tetrachloride, causing the mixture to stand for at least sixteen hours, whereby phosphorus chloride impurities react with said aluminum chloride to form the complex $AlCl_3 \cdot PCl_5$, and separating the germanium tetrachloride from the complex by distillation.

10. The method of purifying silicon tetrachloride containing dissolved chlorine in at least a ten-fold molar excess over the molar content of phosphorus chlorides therein, which method comprises saturating said silicon tetrachloride with aluminum chloride, causing the mixture to react by maintaining contact between said aluminum chloride and said silicon tetrachloride, whereby phosphorus chloride impurities react with said aluminum chloride to form the complex $AlCl_3 \cdot PCl_5$, and separating said silicon tetrachloride from the complex.

References Cited in the file of this patent

UNITED STATES PATENTS

| 1,859,543 | Urbain | May 24, 1932 |
| 2,550,985 | Finholt | May 1, 1951 |
| 2,695,213 | Fernelius | Nov. 23, 1954 |

FOREIGN PATENTS

| 908,492 | Germany | Apr. 5, 1954 |